(12) United States Patent
Bitzer et al.

(10) Patent No.: US 10,574,113 B2
(45) Date of Patent: Feb. 25, 2020

(54) ELECTRIC MOTOR COMPRISING AN INSULATING ELEMENT WITH GUIDE MEANS

(71) Applicant: Robert Bosch GmbH, Stuttgart (DE)

(72) Inventors: Harold Bitzer, Buehl (DE); Peter Hauser, Schwieberdingen (DE); Ralf Lehmann, Oberkirch (DE); Wolfgang Glueck, Baden-Baden (DE)

(73) Assignee: Robert Bosch GmbH, Stuttgart (DE)

( * ) Notice: Subject to any disclaimer, the term of this patent is extended or adjusted under 35 U.S.C. 154(b) by 89 days.

(21) Appl. No.: 15/571,540

(22) PCT Filed: Apr. 19, 2016

(86) PCT No.: PCT/EP2016/058647
§ 371 (c)(1),
(2) Date: Nov. 3, 2017

(87) PCT Pub. No.: WO2016/177569
PCT Pub. Date: Nov. 10, 2016

(65) Prior Publication Data
US 2018/0159399 A1   Jun. 7, 2018

(30) Foreign Application Priority Data
May 5, 2015   (DE) .................. 10 2015 208 251

(51) Int. Cl.
*H02K 1/06* (2006.01)
*H02K 1/16* (2006.01)
(Continued)

(52) U.S. Cl.
CPC .............. *H02K 3/522* (2013.01); *H02K 3/30* (2013.01); *H02K 3/325* (2013.01); *H02K 3/345* (2013.01); *H02K 3/527* (2013.01); *H02K 2203/12* (2013.01)

(58) Field of Classification Search
CPC ...... H02K 2203/12; H02K 3/30; H02K 3/325; H02K 3/345; H02K 3/522; H02K 3/527
See application file for complete search history.

(56) References Cited

U.S. PATENT DOCUMENTS

| 4,004,169 A | * | 1/1977 | Charlton | .................. H02K 3/50 310/71 |
| 5,682,070 A |   | 10/1997 | Adachi et al. | |

(Continued)

FOREIGN PATENT DOCUMENTS

| DE | 19842170 | 3/2000 |
| DE | 10361670 | 8/2005 |

(Continued)

OTHER PUBLICATIONS

International Search Report for Application No. PCT/EP2016/058647 dated Feb. 13, 2017 (English Translation, 5 pages).

*Primary Examiner* — Yuriy Semenenko
(74) *Attorney, Agent, or Firm* — Michael Best & Friedrich LLP

(57) ABSTRACT

The invention relates to an electric motor (1) comprising —a fitting (10) having a plurality of teeth (20) and grooves (30) formed between the teeth (20), —at least one winding (40) formed by a winding conductor (42), wherein at least a part of the winding (40) extends within one of the grooves (30), —an insulating element (50) which electrically separates the winding (40) from the fitting (10). It is proposed according to the invention that the insulating element (50) comprises a guide means (52) which is formed within one of the grooves (30), the guide means (52) guiding a winding conductor section (44) of a winding conductor (42) and the winding conductor (42) being guided out of the fitting (10) by the guide means (52).

15 Claims, 5 Drawing Sheets

(51) Int. Cl.
*H02K 1/26* (2006.01)
*H02K 3/52* (2006.01)
*H02K 3/30* (2006.01)
*H02K 3/32* (2006.01)
*H02K 3/34* (2006.01)

(56) References Cited

U.S. PATENT DOCUMENTS

| | | | |
|---|---|---|---|
| 2002/0047331 A1* | 4/2002 | Takayanagi | H02K 1/187 |
| | | | 310/45 |
| 2003/0011269 A1 | 1/2003 | Takano et al. | |
| 2005/0146238 A1 | 7/2005 | Morikaku et al. | |
| 2006/0061228 A1* | 3/2006 | Lee | H02K 1/2773 |
| | | | 310/156.57 |
| 2014/0009029 A1* | 1/2014 | Schmid | H02K 13/04 |
| | | | 310/208 |
| 2014/0363320 A1 | 12/2014 | Hayakawa et al. | |
| 2018/0375410 A1* | 12/2018 | Moser | H02K 1/146 |
| 2019/0027989 A1* | 1/2019 | Ishigami | H02K 3/34 |

FOREIGN PATENT DOCUMENTS

| | | |
|---|---|---|
| DE | 102006021903 | 11/2007 |
| EP | 2680412 | 1/2014 |
| JP | 2006180674 | 7/2006 |

* cited by examiner

ELECTRIC MOTOR COMPRISING AN INSULATING ELEMENT WITH GUIDE MEANS

BACKGROUND OF THE INVENTION

The invention relates to an electric motor comprising an armature and at least one insulating element.

An electric motor comprising an armature having a multiplicity of teeth and a multiplicity of slots is already known. It is also known for the winding conductors that form the windings to be electrically isolated from the armature by an insulating means. Furthermore, EP 2 680 412 A2 discloses creating a guide means by means of cutouts in the armature itself, but this is very cost-intensive and very complex during production. Moreover, in particular during production, care must be taken to ensure that the guide means in the laminate transitions does not have any sharp-edged locations that might result in damage to the winding conductors or the coating of the winding conductors.

SUMMARY OF THE INVENTION

The electric motor according to the invention has the advantage of enabling the winding conductors to be guided out from the armature in an improved and simplified manner. It should be considered to be a further advantage that the guide means can be implemented very simply and cost-effectively. Furthermore, existing armatures can be supplemented or augmented by an insulating element with guide means according to the invention without a redesign of the armature.

It is advantageous that the winding conductor is led or guided from the armature in an axial direction. Leading the winding conductor out from or into the armature in an axial direction using a guide means enables a facilitated contacting or connection of the winding conductors to further components, in particular the electronics outside the armature. Assembly can be simplified and the production costs can thus be lowered.

It should be regarded as an advantage that the winding conductor section is arranged within the guide means. The width of the guide means is chosen in particular such that only a single winding conductor section is guided within the guide means. Adapting the width of the guide means to the diameter of the winding conductor section makes it possible to guide or lead the winding conductor section within the guide means.

It is advantageous that the guide means separates the guided winding conductor section from the winding. The separation prevents a possible electrical contacting and thus a short circuit. Moreover, the guiding of the winding conductor into or from the armature is improved.

It is particularly advantageous that the guide means is formed as a guide means slot. The guide means slot enables a defined guidance of the winding conductor section of a winding conductor. A defined guidance results in the winding conductor section being guided out from the armature in a defined manner, and thus in a simplified electrical connection of the winding conductor section to further components such as, for example, the circuit carrier or the drive switches.

It should be regarded as advantageous that the guide means is formed as a guide means slot running in an axial direction. The guide means slot is open along the axial direction. Consequently, the winding conductor section can be inserted into the guide means in a simple manner during assembly.

It is advantageous that two guide means are formed in a slot. In particular, two guide means are required per winding conductor. In the case of a three-phase electric motor and, in association therewith, at least three winding conductors, six guide means are required. The required guide means are particularly advantageously arranged within one or a few slots. A guidance of the winding conductors results in a compact design of the electric motor, which in turn reduces the structural space taken up by the electric motor. The openings of the guide means of a slot are advantageously directed toward one another and formed in a parallel fashion. The openings directed toward one another result in a facilitated wrapping of the armature. Moreover, the guided winding conductor sections can be arranged within the guide means in a simple manner.

Furthermore, it should be regarded as advantageous that the guide means are formed at the slot base of the slots. A simpler and more cost-effective wiring can thus be achieved since the winding conductor sections are arranged compactly in the region of the shaft of the electric motor. Moreover, it is advantageous that the further components such as circuit carrier, transistors, connecting plugs, to which the winding conductor sections are connected, can be arranged in the radially inner region of the electric motor. A compact configuration of the electric motor is made possible.

It should be regarded as a further advantage that the insulating element is formed by two or more segments, wherein the segments are arranged on the armature in or counter to the longitudinal direction of the armature, or the longitudinal direction of the electric motor. The formation of at least one insulating element by means of two segments enables a simple production of the insulating element and a simple arrangement, for example by plugging the insulating element onto the armature, on the armature. Furthermore, the segments can be formed identically, which results in a cost saving through the use of identical parts.

It is advantageous that the insulating element is formed by injection molding of an insulating material. In this case, the insulating element is formed by injection molding the insulating material onto the armature.

It is particularly advantageous that the insulating element is formed completely or partly from a plastic or a ceramic material. Plastics or ceramic materials with small thicknesses nevertheless enable a suitable stability and electrical insulation. Furthermore, it is advantageous that the armature consists of a laminate stack comprising a multiplicity of laminations. The individual teeth and slots are formed in particular by the laminate stack, or the laminations.

It should be regarded as a further advantage that the armature can be used in a stator or in a rotor of an electric motor.

It is advantageous that a carrier having cutouts is provided, wherein the winding conductor sections of the winding conductors that are guided out from or guided into the armature run within a cutout of the carrier. The number of cutouts corresponds to the number of winding conductors guided into the armature and/or guided out from the armature. A winding conductor section of a winding conductor is advantageously arranged within a cutout of the carrier. The carrier enables an improved guidance and enables the winding conductors to be guided out from and/or guided into the armature in an improved manner.

It is particularly advantageous that a clamping element is provided. The clamping element has at least one clamping foot which fixes the winding conductor sections of the winding conductors within the guide means. The fixing is effected, in particular, tangentially and/or axially. In an assembled electric motor, the clamping foot is arranged between the guide means within a slot.

It is advantageous that the clamping element interacts with the carrier, in particular the clamping element is connected to the carrier by means of the clamping feet. Furthermore, it is advantageous that the clamping element is fixed on the insulating element by means of locking means on the clamping foot.

BRIEF DESCRIPTION OF THE DRAWINGS

Exemplary embodiments are illustrated in the figures and explained in greater detail in the description below. In the figures.

DETAILED DESCRIPTION

Figure 1:
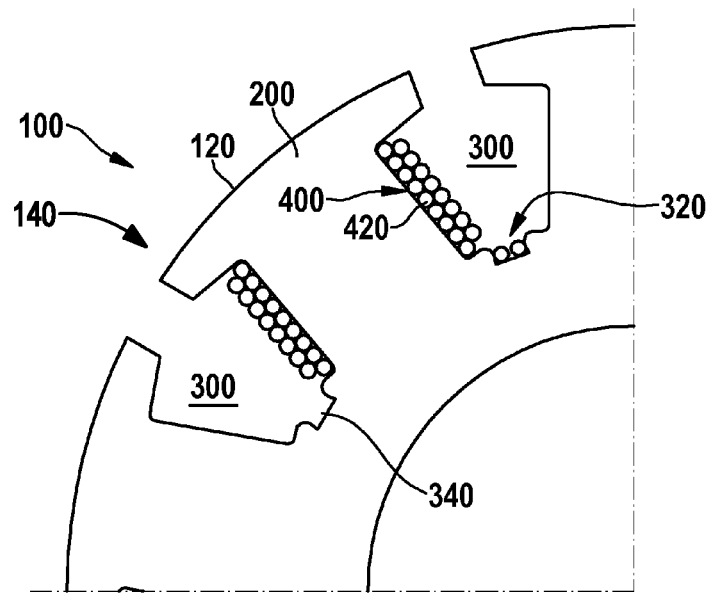
FIG. 1 shows an armature with guide means as known in the prior art.

FIG. 1 shows an armature of an electric motor as known from the document EP 2 680 412 A2. The armature 100 has a laminate stack 120 consisting of a plurality of laminations 140. The armature 100 comprises teeth 200 with winding wires 420 wound around them. The winding wires 420 form windings 400 that are required for the operation of the electric motor. Slots 300 are formed between the teeth 200. The slots 300 separate the teeth 200 from one another. The winding wires 420 forming the windings 400 run partly within the slots 300. At the slot base 320 of the slots 300, a channel 340 is formed in the armature 100. The channel 340 is formed by the armature 100 itself.

Figure 2:
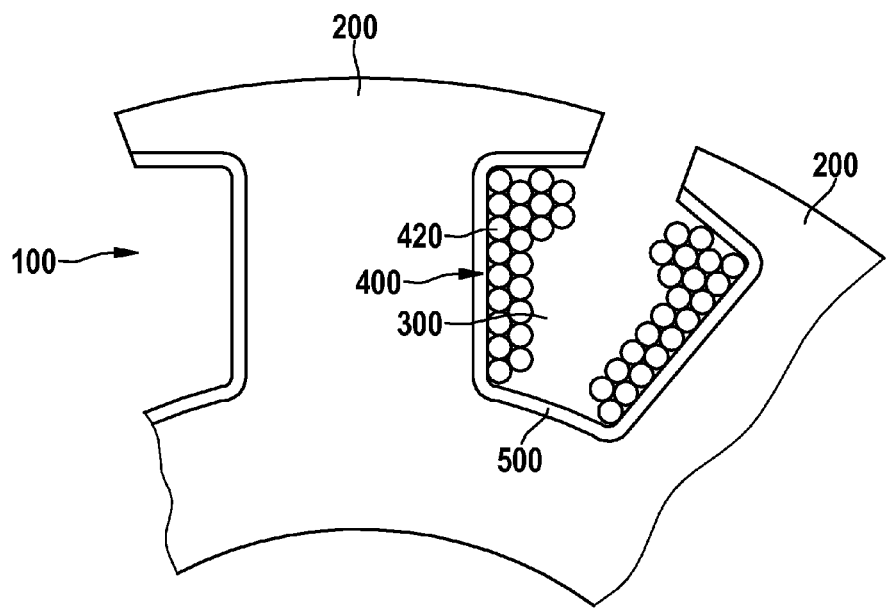
FIG. 2 shows an armature without guide means as known in the prior art.

A further armature 100 from the prior art is disclosed in FIG. 2. The armature 100 has teeth 200 separated by slots 300. The winding wires 420 run within the slots 300. The winding wires 420 are wound around the tooth 200 and form the winding 400. An insulating element 500 is formed between the tooth 200 and the winding wires 420. The insulating element 500 prevents an electrical connection between the winding wires 420 and the armature 100. An embodiment in accordance with FIG. 2 does not enable an exact guidance of a winding wire end 440 of the winding wire 420.

Figure 3:
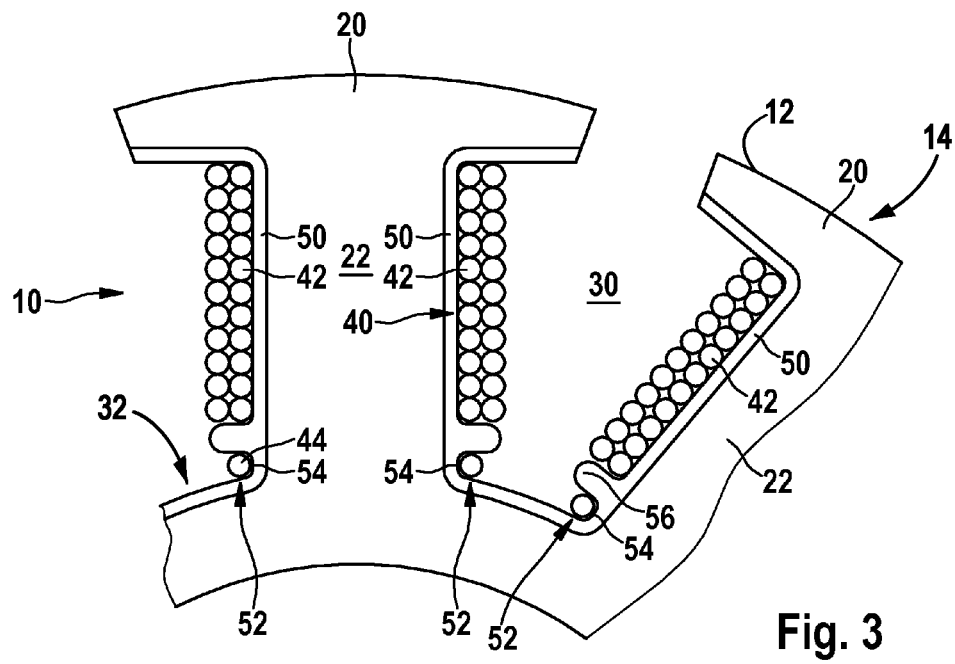
FIG. 3 shows an excerpt from a first exemplary embodiment of an armature according to the invention.

FIG. 3 shows an excerpt from a first exemplary embodiment of an armature 10 according to the invention for an electric motor 1. The armature 10 has a multiplicity of teeth 20. The teeth 20 are separated from one another by means of slots 30 in the circumferential direction. The armature 10 and the teeth 20 are formed in particular by a laminate stack 12. The laminate stack 12 consists of a multiplicity of individual laminations 14 that are arranged one on top of another, in particular arranged in a stacked fashion. The individual laminations 14 can be separated from one another in particular by insulation layers. Winding conductors 42 are arranged within the slots 30. The winding conductors 42 are wound at least around one tooth 20 and form a winding 40 on said tooth 20. Depending on the type and driving of the electric motor 1, one or more windings 40 are formed per tooth 20. Moreover, a winding conductor 42 can be wound around more than one tooth 20 and thus form more than one winding 40.

The winding conductor 42 or the winding conductors 42 is/are separated from the armature 10 by an insulating element 50. The insulating element 50 separates the winding conductor 42, or the winding 40 and the tooth 20, in particular in the region of the slot 30. The insulating element 50 prevents a direct electrical contact between the winding conductors 42 and the armature 10. Moreover, the insulating element 50 prevents the formation of damage during the winding of the windings 40. In particular, the insulating element 50 prevents damage to the coating of the winding conductor 42 in the region of the edges of the topmost lamination 14 of the laminate stack 12, in particular during production. The insulating element 50 is arranged within the slots 30 by way of example in FIG. 3. It covers the area of the teeth 20 which are directed toward a slot 30. In accordance with one development of the invention, the insulating element 50 can also comprise further parts of the tooth 20, in particular the areas 22 of the tooth 20 which run perpendicularly or substantially perpendicularly to the axial direction of the armature 10.

According to the invention, at least one insulating element 50 is formed, in particular arranged, on the armature 10. The insulating element 50 has a guide means 52 at least in a slot 30. The guide means 52 serves for guiding a winding conductor section 44 of a winding conductor 42. The winding conductor section 44 is guided or led by the arrangement of the winding conductor section 44 of a winding conductor 42 within the guide means 52. The winding conductor 42 is led out from the armature, in particular in an axial direction of the armature 10, or is led or guided into the armature 10 by the guide means 52. The guidance of the winding conductor section 44 by the guide means 52 results in the winding conductors 42 being led out from and/or into the armature 10 in a defined manner. In particular, an arrangement or alignment or formation of the further course of the winding conductors 42 outside the armature 10, preferably parallel to the axial direction of the armature 10, is possible owing to the guide means 52. The winding conductor section 44 can be formed in particular in the region of the winding conductor end or the winding conductor beginning. By way of example, the winding conductor section 44 could in particular form the winding conductor end or the winding conductor beginning or be formed adjacent thereto.

In accordance with FIG. 3, two guide means 52 are formed within a slot base 32 of a slot 30. The guide means 52 comprise a guide means slot 54 with a separating means 56. With the aid of the separating means 56, the guide means 52 separates the winding conductor section 44 from the part of the winding conductor 42 which, when wound around the tooth 20, forms a winding 40. The guide means 52, in particular the separating means 56, separates the winding conductor section 44 from the further part of the winding conductor 42. Moreover, the separating means separates the winding conductor section 44 within the guide means 52 from further winding conductors 42.

The length, in particular the length in the circumferential direction of the armature, of the separating means 56 corresponds to the thickness of the windings 40 within a slot 30. Advantageously, two guide means 52 are arranged within a slot 30. The openings of the guide means slots 54, or the openings of the guide means 52, in particular substantially, face one another. The guide means 52 or the guide means slots 54 run in particular in the longitudinal direction of the armature 10 or parallel or antiparallel to the shaft or axis of the electric motor 1, or in the axial direction of the armature 10.

Figure 4:
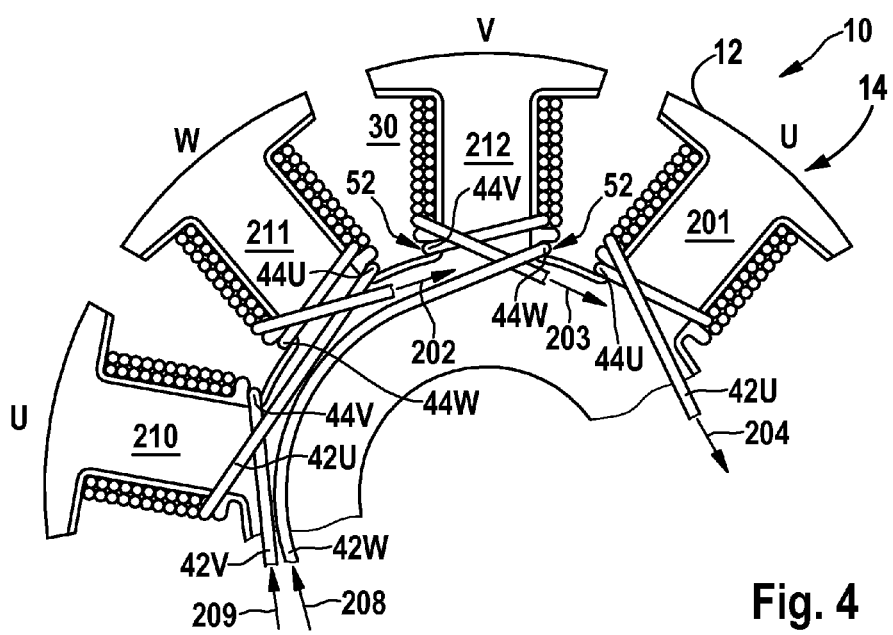
FIG. 4 shows an armature with an exemplary interconnection.

FIG. 4 shows an excerpt with four teeth 201, 210, 211, 212 of an armature 10 of an electric motor 1 according to the invention. The armature 10 has for example a total of twelve teeth 20, or 201 to 212. In particular, the teeth 201, 210, 211 and 212 are shown. The further teeth 202-209 are formed in a corresponding manner.

The electric motor 1 is an electric motor 1 having three phases U, V, W. The electric motor 1 comprises at least three winding conductors 42 which are wound around the teeth and form windings 40. The windings 40 of a winding conductor 42 correspondingly form a phase U, V, W of the electric motor 1. The winding conductor 42U is wound around the teeth 201, 204, 207 and 210 and thus forms four windings. The winding conductor 42W is wound around the teeth 202, 205, 208 and 211 and thus forms four windings. The winding conductor 42V is wound around the teeth 203, 206, 209 and 212 and thus forms four windings.

Each winding conductor 42 preferably has two winding conductor sections 44, which are guided by a guide means 52. By way of example, the winding conductor 42U of the phase U has the winding conductor sections 44U, the winding conductor 42V of the phase V has the winding conductor sections 44V, and the winding conductor 42W of the phase W has the winding conductor sections 44W. The winding conductor sections 44 are arranged within a guide means 52. In particular, the winding conductor 42U of the phase U is wound around the tooth 210. The winding conductor 42W is wound around the tooth 211. The winding conductor 42W is additionally wound around the teeth 202, 205 and 208. The winding conductor 42W thus forms the windings 40 of the teeth 211, 202, 205 and 208. The first winding conductor section 44W of the winding conductor 42W is guided by a guide means 52 formed between the teeth 210 and 211. The second winding conductor section 44W of the winding conductor 42W is led in a further guide means 52 formed between the teeth 212 and 201.

The winding conductor sections 44V of the winding conductor 42V are guided within the guide means 52 between the teeth 210 and 211 and also 211 and 212. The winding conductor sections 44U are guided within the guide means 52 between the teeth 211 and 212 and also 212 and 201. The winding conductor sections 44 of the winding conductors 42 run within the guide means 52 parallel or antiparallel to the longitudinal axis or axis of the electric motor 1.

In accordance with one development of the invention, the electric motor has a multiplicity of winding conductors 42 having winding conductor sections 44. In particular, the winding of each tooth 20 is formed by a winding conductor 42. The winding conductor sections 44 of the winding conductor 42 which forms a winding on a first tooth are guided in the guide means 52 adjoining the first tooth. In particular, the interconnection of the individual winding conductors 42 or of the windings 40 is effected outside the armature 10. Preferably, a motor phase U, V, W consists of a plurality of windings 40, or winding conductors 42, which are electrically connected to one another. Two guide means 52 are formed per tooth 20.

Figure 5:
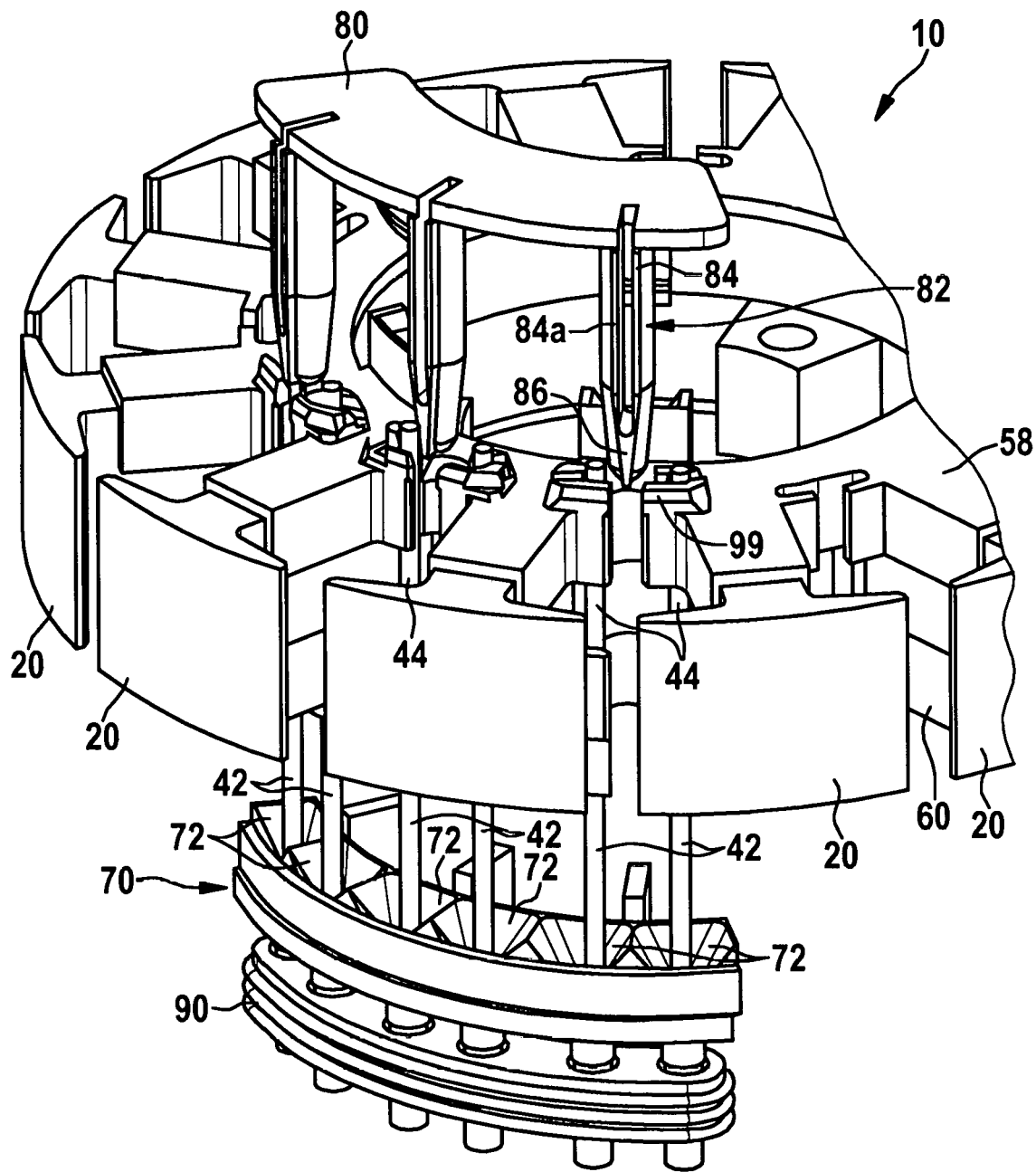
FIGS. 5 and 6 show a second exemplary embodiment.

A further exemplary embodiment of an armature 10 of an electric motor 1 according to the invention is disclosed in FIG. 5. An insulating element 50 is arranged on the armature 10. The insulating element 50 is formed by two segments 58, 60. The first segment 58 of the insulating element 50 is arranged on one of the longitudinal sides of the armature 10 and partly between the slots 30 on the armature 10. The second segment 60 is correspondingly arranged on the opposite longitudinal side of the armature 10 and likewise partly between the slots 30 on the armature 10. The first segment 58 and the second segment 60 are formed in a manner extending fully circumferentially. The segments 58, 60 are thus arranged on all teeth 20, or 201-212. The bipartite formation of the insulating element 50 into a first segment 58 and a second segment 60 enables a simple mounting of the insulating element 50 on the armature 10. The process of arranging the two segments 58, 60 on the armature 10 by means of mating together can be implemented very simply during mounting.

In accordance with one development of the invention, the two segments 58, 60 are formed as identical parts, as a result of which the production costs of the segments 58, 60 are minimized. The segments 58, 60 can be spaced apart from one another in the longitudinal or axial direction of the armature 10 during the arrangement on the armature 10.

A fixing element 99 can additionally be arranged on the guide means 52. The fixing element 99 enables an even more precise guidance of the winding conductor sections 44. In particular, the fixing element 99 can also be part of the guide means 52.

Furthermore, a carrier 70 is provided, which has cutouts 72 for guiding and fixing the winding conductors 42 guided from the armature 10. The fixing of the winding conductor sections 44 in the guide means 52 results in the winding conductors 42 being guided out in the longitudinal direction of the armature 10. The winding conductors 42 guided away are introduced into the cutouts 72 of the carrier 70 during mounting. The cutouts 72 are formed in a conical fashion, as a result of which the winding conductors 42 guided out or guided in are introduced into the cutouts 72 in a simplified manner.

A clamping element 80 serves for fixing or locking the winding conductor sections 44 within the guide means 52. For this purpose, the clamping element 80 has at least one clamping foot 82. The clamping feet 82 are arranged between the winding conductor sections 44 within a slot 30 during the fitting of the clamping element 80. The clamping feet 82 are formed in an elastic fashion, as a result of which a flexible locking of the winding conductor sections 44 within the guide means 52 is achieved. Via the openings of the guide means 52, in particular, the clamping feet 82 can interact with the winding conductors 42 guided in the guide means 52. A clamping foot 82 fixes the winding conductor section 44 in particular tangentially and/or axially within the guide means 52.

By way of example, the clamping feet in accordance with FIG. 5 have two clamping foot limbs 84*a* and 84*b*. The two clamping foot limbs 84*a*, 84*b* are arranged parallel. An air clearance is formed between the two clamping foot limbs 84*a*, 84*b*, as a result of which an elastic deformation of the clamping foot limbs 84*a*, 84*b* toward one another is made possible. This deformation takes place in particular during the arrangement of the clamping foot limbs 84*a*, 84*b* within the slots 30. The two clamping foot limbs 84*a*, 84*b* are connected to one another by a clamping foot tip 86. The clamping foot tip 86 enables improved guidance of the clamping foot 82 during mounting. Furthermore, the clamping foot tip 86 can have means which make it possible to lock the clamping foot 82 on the carrier 70 or the cutouts 72 of the carrier 70. Moreover, the clamping foot 82 can have means which make it possible to lock the clamping foot 82 on an insulating element 50. Said means can be formed on the clamping foot tip 86, for example. The clamping foot limb 84a, 84b become tangential to the winding conductor section 44 in the guide means 52.

The clamping element 80 and the carrier 70 interact in particular through the clamping feet 82. The clamping feet 82 can be secured on the carrier 70, for example. A clamping of the entire armature 10 is achieved as a result.

The guide means 52 enables a defined alignment of the winding conductor sections 44 and thus a defined alignment of the winding conductors 42 outside the armature 10, as a result of which a simplification of the contacting with a printed circuit board is made possible during mounting. In particular, it is possible to shorten the winding conductors 42 guided out from the armature 10 to an identical length and to bring them into contact with the contact locations of the printed circuit board. Afterward, an electrical contacting can be achieved in a simple manner by soldering.

The insulating element 50 is formed from a material that is electrically insulating. The insulating element 50 is formed partly or completely from ceramic or a plastic, for example.

Furthermore, it is possible to arrange a sealing means 90 having cutouts 92, which are formed in a manner corresponding to the cutouts 72 of the carrier 70, in a manner following on with respect to the carrier 70 in the direction of the winding conductor section 44.

Figure 6:
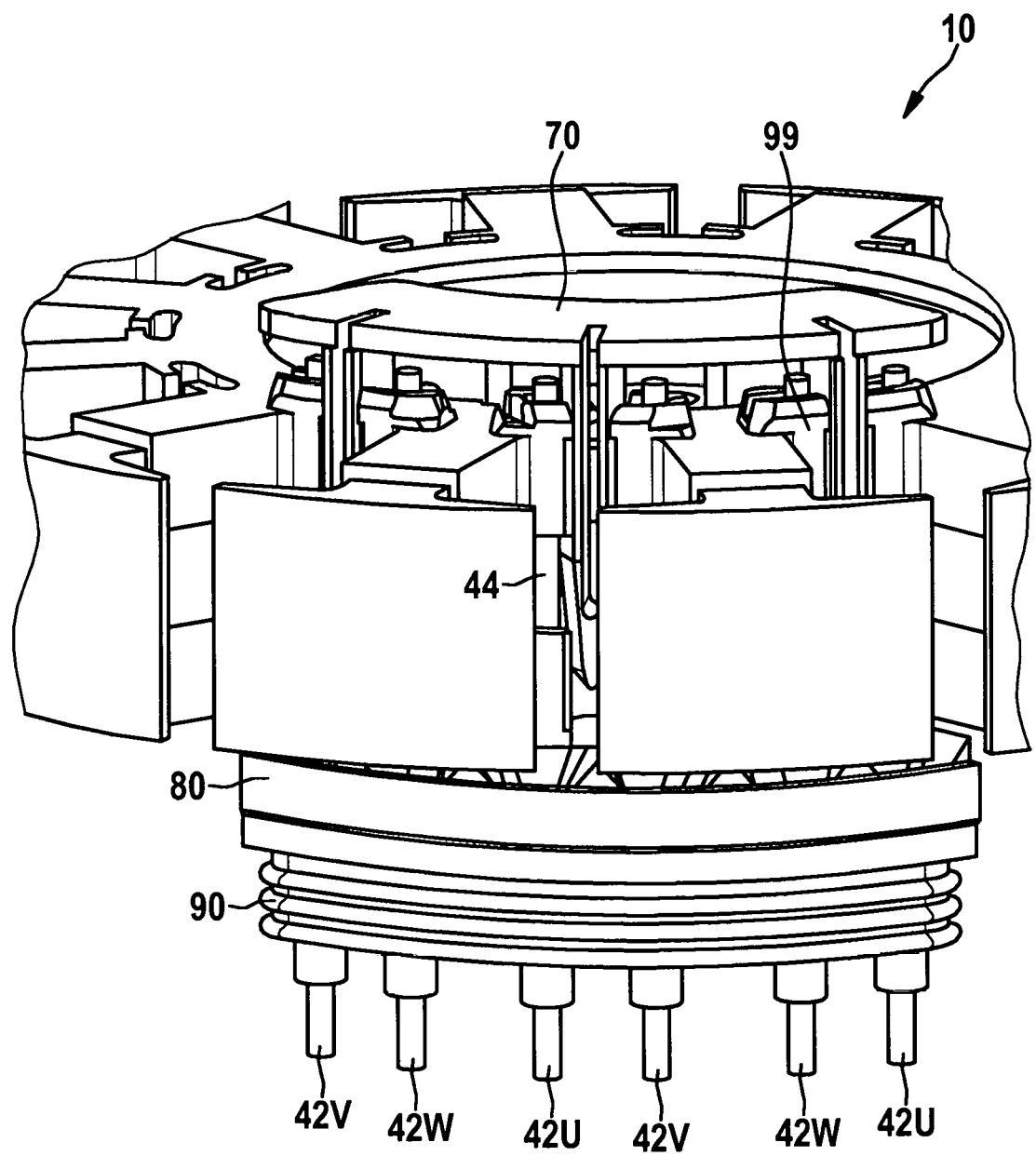

FIG. 6 shows the armature 10 in accordance with FIG. 5, wherein the carrier 70, the clamping element 80 and the sealing means 90 are arranged on the armature 10. The winding and interconnection of the winding conductors 42 are effected for example in accordance with FIG. 4.

Figure 7:
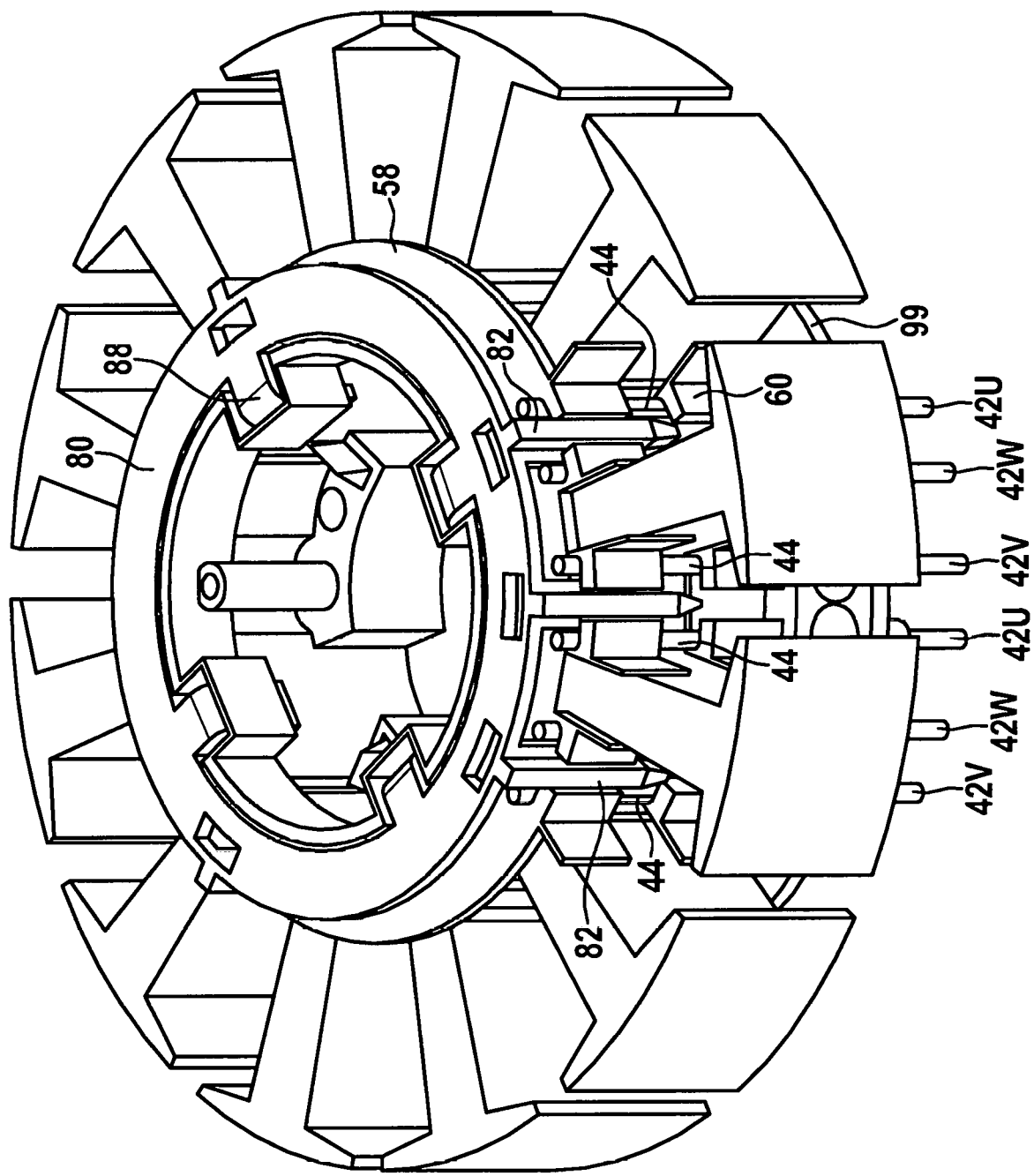
FIG. 7 shows a further exemplary embodiment.

FIG. 7 illustrates a further exemplary embodiment. The insulating element 50 is formed by two segments 58, 60, as in the exemplary embodiment in FIGS. 5 and 6. A clamping element 80 is arranged on the first segment 58. The clamping element 80 and the insulating element 50, in particular the segment 58, are connected to one another in particular by securing means 88, preferably latching elements. The securing means 88 engage into the securing means of the insulating element 50. The clamping elements 80 fix the winding conductor section 44 within the guide means 52. The clamping element 80 presses the winding conductor sections 44 into the guide means 52. The clamping element 80 prevents axial displacement of the winding conductor sections 44, in particular during emplacement of the sealing means 99. The clamping element 80 has a clamping foot 82. The clamping foot 82 is formed on the clamping element 80 perpendicularly to the surface of the clamping element 80. The clamping foot 82 runs parallel to the axis of the electric motor 1. The clamping foot 82 has a clamping foot tip 86. The clamping foot tip 86 enables the improved guidance of the clamping foot 82 during mounting. Furthermore, the clamping foot tip 86 can have means which make it possible to lock the clamping foot 82 on the carrier 70 or the cutouts of the carrier 70. Moreover, the clamping foot 82 can have means which make it possible to lock the clamping foot 82 on an insulating element 50. The clamping foot 82 is arranged between the guide means 52.

In accordance with a further exemplary embodiment, the insulating element 50 is formed by means of injection molding an insulating material onto the armature 10. The guide means 52 are also created by the injection molding.

In accordance with one development of the invention, the guide means 52 is formed as a wire laying slot.

The armature 10 is formed as an element of the stator in accordance with FIGS. 3-7. However, it can also be formed as an element of a rotor.

The invention claimed is:
1. An electric motor (1) comprising
an armature (10) having a multiplicity of teeth (20) and slots (30) formed between the teeth (20),
at least one winding (40) formed by a winding conductor (42), wherein at least one part of the winding (40) runs within one of the slots (30), and
an insulating element (50), which electrically isolates the winding (40) and the armature (10),
characterized in that the insulating element (50) has a guide means (52) formed within one of the slots (30), wherein the guide means (52) guides a winding conductor section (44) of the winding conductor (42) and the winding conductor (42) is led from the armature (10) by the guide means (52), characterized in that a clamping element (80) is provided, wherein the clamping element (80) has at least one clamping foot (82) which fixes the winding conductor section (44) of the winding conductor (42) within the guide means (52).

2. The electric motor (1) as claimed in claim 1, characterized in that the winding conductor (42) is led from the armature (10) in an axial direction.

3. The electric motor (1) as claimed in claim 1, characterized in that the guide means (52) separates the guided winding conductor section (44) from the winding (40).

4. The electric motor (1) as claimed in claim 1, characterized in that the guide means (52) is formed as a guide means slot (54) running in an axial direction, wherein the guide means slot (54) is open along the axial direction.

5. The electric motor (1) as claimed in claim 1, characterized in that two guide means (52) are formed in one of the slots (30), wherein the guide means (52) are directed toward one another within the one of the slots (30).

6. The electric motor (1) as claimed in claim 1, characterized in that the guide means (52) is formed at a slot base (32) of one of the slots (30).

7. The electric motor (1) as claimed in claim 1, characterized in that the insulating element (50) is formed by at least two segments (58, 60), wherein the segments (58, 60) are arranged on the armature (10) in and counter to the axial direction of the armature (10).

8. The electric motor (1) as claimed in claim 1, characterized in that the insulating element (50) is formed by injection molding an insulating material onto the armature (10).

9. The electric motor (1) as claimed in claim 1, characterized in that the armature (10) is part of at least one of a stator and a rotor of the electric motor (1).

10. The electric motor (1) as claimed in claim 1, characterized in that a carrier (70) having cutouts (72) is provided, wherein the winding conductor sections (44) of the winding conductors (42) that are guided out from or guided into the armature (10) run within a cutout (72) of the carrier (70).

11. The electric motor (1) as claimed in claim 1, characterized in that the clamping element (80) interacts with the carrier (70).

12. The electric motor (1) as claimed in claim 1, characterized in that the clamping element (80) is fixed on the insulating element (50) by locking means on the clamping foot (82).

13. The electric motor (1) as claimed in claim 2, characterized in that a width of the guide means (52) is such that only a single winding conductor section (44) is guided within the guide means (52).

14. The electric motor (1) as claimed in claim 1, characterized in that the winding conductor section (44) of the winding conductor (42) is fixed within the guide means (52) tangentially and/or axially, and is arranged between the guide means (52) within a slot (30).

15. The electric motor (1) as claimed in claim 11, characterized in that the clamping element (80) is connected to the carrier (70) by the clamping feet (82).

\* \* \* \* \*